United States Patent [19]

Brown

[11] Patent Number: 4,925,107

[45] Date of Patent: * May 15, 1990

[54] LOW COST MIXING AND DISPENSING GUN FOR REACTIVE CHEMICAL PRODUCTS

[75] Inventor: Daniel P. Brown, West Haven, Ill.

[73] Assignee: Insta-Foam Products, Inc., Joliet, Ill.

[*] Notice: The portion of the term of this patent subsequent to Jun. 3, 2004 has been disclaimed.

[21] Appl. No.: 67,096

[22] Filed: Jun. 26, 1987

Related U.S. Application Data

[63] Continuation of Ser. No. 755,859, Jul. 17, 1985, Pat. No. 4,676,437.

[51] Int. Cl.$^5$ .................. F23D 11/46; B05B 7/121; B05B 7/02
[52] U.S. Cl. ..................... 239/414; 239/417.5; 239/526; 239/527
[58] Field of Search ............ 239/304, 413, 414, 417.5, 239/526, 527; 137/625.19, 625.23, 625.32, 625.47, 625.5; 251/209, 309, 242

[56] References Cited

U.S. PATENT DOCUMENTS

| 2,520,591 | 8/1950 | Wilmarth | 239/414 X |
| 3,193,245 | 6/1965 | Parker | 251/209 X |
| 3,558,100 | 1/1971 | Hulsey | 251/209 X |
| 3,784,110 | 1/1974 | Brooks | 239/304 |
| 4,117,551 | 9/1978 | Brooks et al. | 239/414 X |
| 4,169,545 | 10/1979 | Decker | 239/527 X |
| 4,193,546 | 3/1980 | Hetherington et al. | 239/413 X |
| 4,225,087 | 9/1980 | Lawlor | 239/526 |
| 4,263,166 | 4/1981 | Adams | 239/414 |
| 4,290,452 | 9/1981 | Takashashi | 137/625.23 |
| 4,676,437 | 6/1987 | Brown | 239/414 |

Primary Examiner—Andres Kashnikow
Attorney, Agent, or Firm—Lockwood, Alex, Fitzgibbon & Cummings

[57] ABSTRACT

A gun having a gun body which includes a housing for component inlet and outlet passages and for a product flow control valve, which further includes a handle, a nozzle receiver assembly, and a trigger for rotating a spool valve between open, closed, and intermediate positions, and wherein means are provided for controlling the proportion and flow rates of the components within the flowing passages, and to facilitate insertion, locking, and ejection of the nozzle within the gun body.

7 Claims, 2 Drawing Sheets

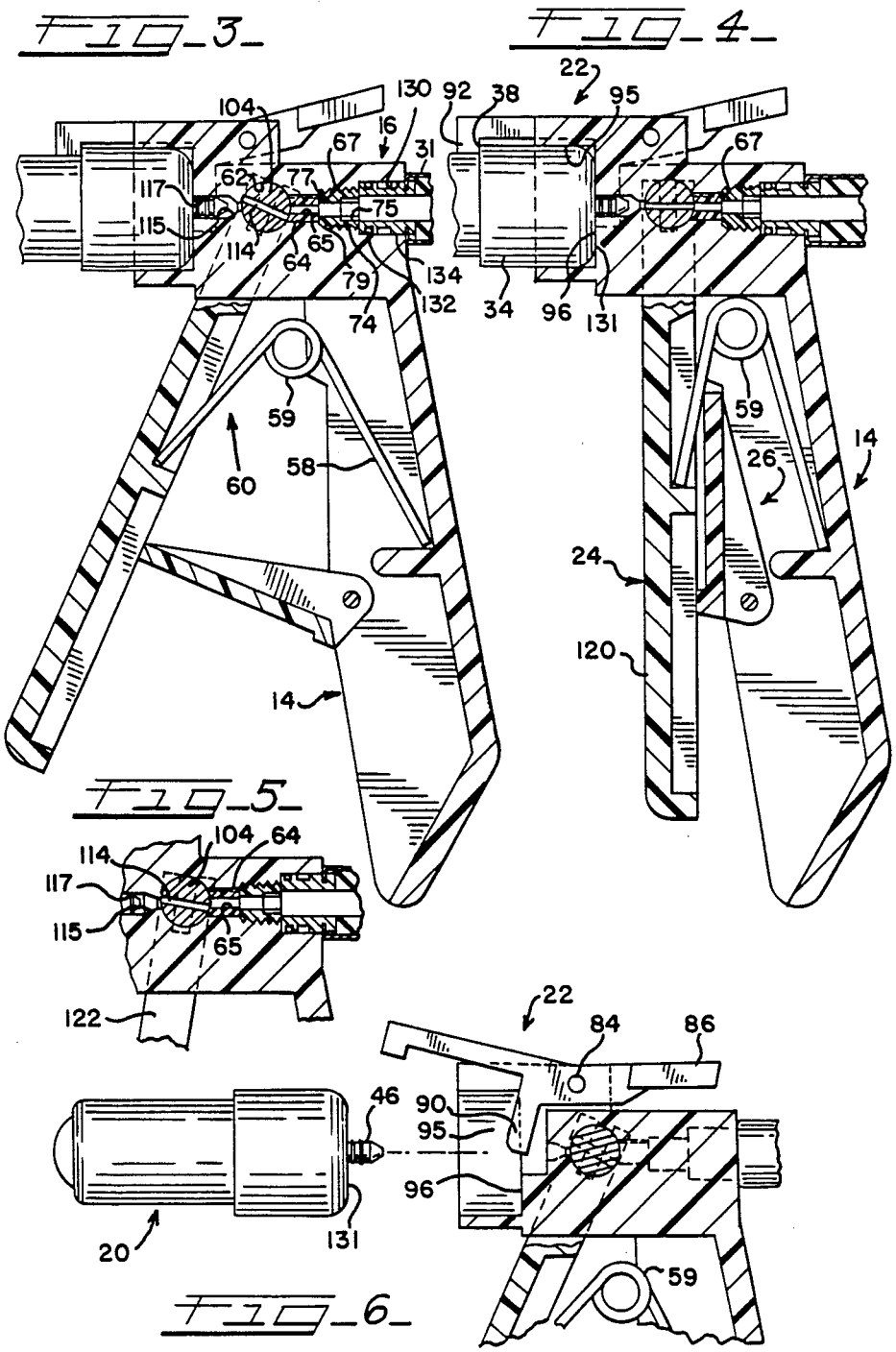

LOW COST MIXING AND DISPENSING GUN FOR REACTIVE CHEMICAL PRODUCTS

This application is a continuation of my earlier application, Ser. No. 755,859, filed July 17, 1985, now U.S. Pat. No. 4,676,437.

BACKGROUND OF THE INVENTION

The present invention relates generally to mixing and dispensing guns for use in the plastic foam industry, and more particularly, to a design of gun which is adapted for easy, low cost mass production manufacture and which is capable of performing the functions needed for precise mixing and dispensing of thermosetting chemical products resulting from the mixture of two reactive chemical components.

In recent years, there has been an ever increasing use of polyurethane and like plastic foams for a number of applications. Urethane and related products, including isocyanurates silicones phenolics and epoxies, are well known as having a number of desirable characteristics. These include the potential for excellent heat insulation, compatability with low cost blowing agents, reproducability of chemical characteristics and excellent chemical and physical properties in the finished product.

Many urethane foams are resistant to degradation by many common solvents, moisture and atmospheric oxidation. Urethanes provide the best combination of heat insulation and physical strength for a given cost. The foam is naturally an adhesive material and bonds well to any number of substates In this connection, it can add structural strength to many articles wherein such strength is an important element. Fire retardance may be achieved easily with available formulations.

Moreover, urethane foams, being the reaction product of two individual components, may be varied in chemical composition for a number of purposes. Thus, urethane foams may be formulated so as to provide a finished product which is quite rigid, which is semi-rigid, or which is somewhat flexible and/or elastomeric. Foams of the kind in question may be made with almost exclusively closed cells, or with a desired proportion of open cells.

The types of products with which the instant invention is concerned are primarily the closed cell foam types of product used for insulation purposes in building structures and open the celled product used for packaging applications. The components of the foam are passed at high pressures above 40-50 p.s.i. through a gun which serves to meter and mix the components thoroughly in a nozzle from which they are discharged. According to the invention, chemicals components are taken directly to a job site in pre-pressurized cylinders, or shipped in bulk tanks requiring external pumps or other sound of pressurization. Here, the amount of product required to be dispensed is not so large as to require permanent, expensive equipment, as would be used in a factory. However, the amount of product used is significantly larger than could be accommodated by using small, individual aerosol cans, for example. The individual containers of the components carry from several pounds up to perhaps 25 to 50 or even more pounds or more of each component. These tanks are sufficiently portable to be moved about on the job site by one worker, but yet are able to provide sufficient foam to provide several hundred or thousand board feet of coverage.

With the ability of the chemical supply tanks to be moved about, there has been a significant demand for a dispensing gun which would provide the advantages and characteristics of low cost, operating flexibility and reliability in use.

One of these required characteristics is that the product be able to be mixed in a nozzle which can be used and then disposed of after use, and replaced with another nozzle at low cost for a succeeding job or succeeding phase of the job then being undertaken.

Another desirable characteristic is that the chemical products or constituents be able to be metered accurately and proportioned both as between themselves, and as a whole considering the desired dispensing rate.

A still further requirement of a gun of the type in question is that the valving be constructed and arranged so as to permit a proper proportioning action to be maintained even when the trigger is held completely opened or is opened within an intermediate range of positions to vary the discharge rate as desired.

An ideal gun, consequently, would be one which is able to be reliably manufactured at low cost and which will prevent premixing of the components, keeping them isolated from each other until they are discharged into the mixing chamber of an associated nozzle.

Another characteristic of such a gun would be the presence of a valve and trigger assembly which would permit this control, as well as provision of means for controlling the flow of components to the valve passages contained in the gun.

Another desirable characteristic of such a gun would be the ability to position a discharge nozzle correctly by "feel" and make it possible for the operator to insure himself that the nozzle is fully seated in a locked position before the gun is likely to be used.

Yet another desirable characteristic would be that as the ability to rapidly eject a used nozzle so that a new nozzle could be used in place thereof.

Another desirable characteristic would be a gun having the porting designed so as not to have any dead space for the accumulation of the chemicals in the port where they may be exposed to the atmosphere. Specifically, where the isocyanate component of the polyurethane would be allowed to have contact with atmospheric moisture (humidity) and react and crystallize in the port, rendering the gun inoperable.

Accordingly, it is a primary object of the present invention to provide an improved combination mixing and discharging gun for reactive chemical components, including a gun itself, or such gun combination with a disposable nozzle serving to mix and discharge the components being fed to it under the control of an operator-manipulated trigger.

Another object of the invention is to provide a gun which includes components which are easy to manufacture at low cost, incorporating a minimum number of components designed for mass production with no sub-component assembly or remanufacture.

A still further object of the invention is to provide a gun which includes a valve assembly adapted to insure that the components are not mixed with each other prior to their discharge into the mixing chamber of the associated nozzle.

A still further object of the invention is to provide a valve arrangement which is adapted to promote mixing of the desired proportions of components at a variety of trigger or discharge rate settings.

Yet another object of the invention is to provide a gun which includes a number of easy-to-replace components, and wherein the stoichiometry of the product mixing may be changed or adjusted if desired without great inconvenience or expense.

Another object of this invention is to provide a unique valve component seating arrangement allowing for complete seating under high pressure without leakage.

A still further object of the invention is to provide a gun which includes plural low-cost individually replaceable components.

Another object of the invention is to provide a gun which requires a minimum of complex moving parts, and which is adapted to provide relatively foolproof operation in use.

Still another object of the invention is to provide a gun which is compatible with existing mixing and dispensing nozzles which are associated with the gun in use.

A still further object is to provide a gun wherein the valve provides positive product flow shutoff, and wherein the outlet passage or passage downstream of the flow control valve is extremely short and has close contact with the nipple ports of an associated nozzle.

The present invention achieves the foregoing and other objects and advantages by providing a gun having a gun body which includes a housing for component inlet and outlet passages and for a product flow control valve, which further includes a handle, a nozzle receiver assembly, and a trigger for rotating a spool valve between open, closed, and intermediate positions, and wherein means are provided for controlling the proportion and flow rates of the components within the flowing passages, and to facilitate insertion, locking, and ejection of the nozzle within the gun body.

The exact manner in which the foregoing and other objects and advantages of the invention are achieved in practice will become more clearly apparent when reference is made t the following detailed description of the preferred embodiments of the invention set forth by way of example and shown in the accompanying drawings, wherein like reference numbers indicate corresponding parts throughout.

BRIEF DESCRIPTION OF THE DRAWINGS

FIG. 3 is a vertical sectional view of the gun of FIG. 2, showing the trigger in the off position with the trigger safety engaged;

FIG. 4 is a vertical sectional view similar to that of FIG. 3, showing the trigger in the fully actuated position for maximum rate discharge of components;

FIG. 5 is a fragmentary sectional view of the component flow-control valve spool showing the same in an intermediate or metering position of use; and FIG. 6 is a fragmentary view, partly in section and partly in elevation, and showing the mixing and dispensing nozzle and the nozzle latching and ejection element in the unlocked position

PREFERRED EMBODIMENTS OF THE INVENTION

While the advantages of the invention may be achieved and practiced by the use of other structures, a preferred embodiment of the invention is of the type shown, wherein the gun assembly is made principally from plastic material and includes the various structural and functional features to be described here in detail.

Figure 1:
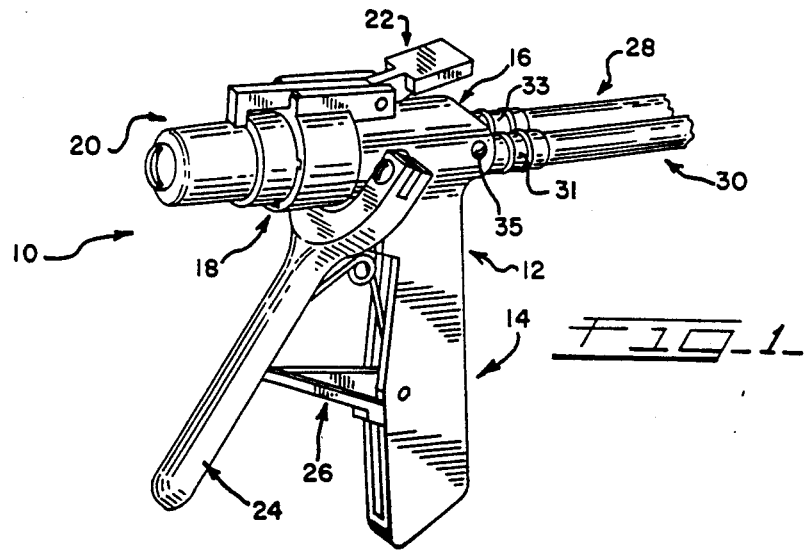
FIG. 1 is a perspective view of the mixing and dispensing gun assembly of the invention, showing the same in a typical position of use with the mixing and dispensing nozzle in place in the gun and with the trigger in the closed position and the trigger safety engaged.

Referring now to FIG. 1, a gun assembly generally designated 10 is shown to include a number of principal components, including a gun body generally designated 12 and shown to be subdivided into a handle generally designated 14, a hose retaining component passage and flow control valve housing 16, a nozzle receiver assembly 18, a removeable nozzle 20, a combination nozzle latch and ejector element 22, a trigger assembly 24, a trigger safety 26, and first and second component inlet hoses 28, 30, each terminating in forward fittings 31, 33.

Figure 2:
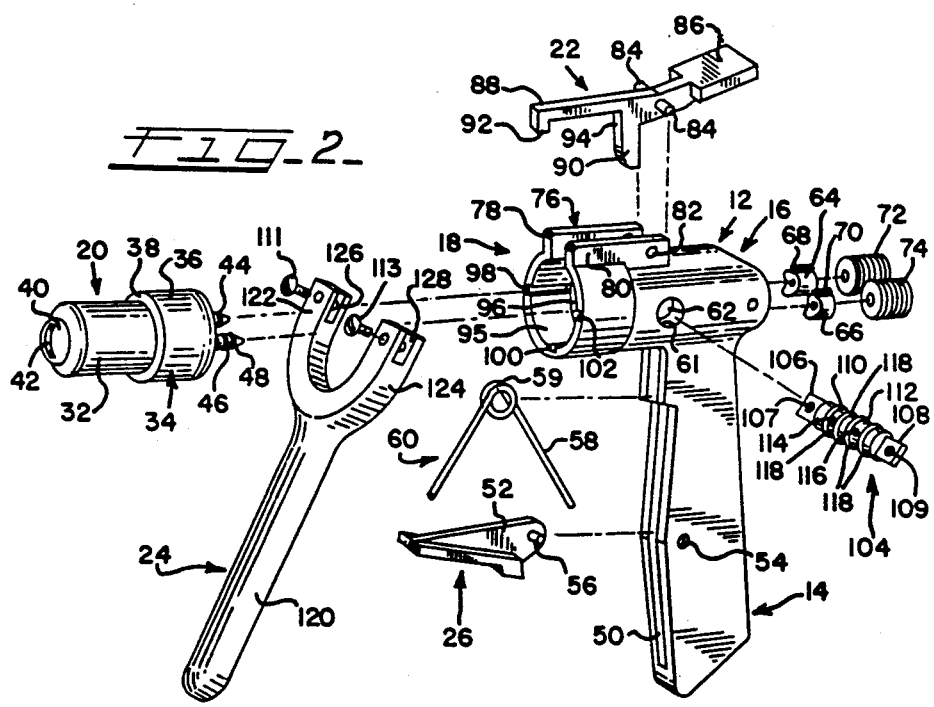
FIG. 2 is an exploded perspective view of the gun of FIG. 1, showing the various components, including the nozzle, the trigger, the latching and ejection mechanisms, the component flow-control valve, and the component seats and seat compression screws in their intended relation of assembly.

Referring now to FIG. 2, it is shown that the nozzle assembly generally designated 20 includes a cylindrical reduced diameter main mixing body portion 32, an enlarged diameter seating body portion 34 having a cylindrical exterior registration and alignment surface 36, which includes a forwardly directed, radially extending annular latch-engaging surface 38. The nozzle 20 also includes means in the form of a spreader 40 having a contoured outlet passage 42 at the front end thereof for discharging the foaming mixed product. At its axially inner (toward the gun body) end portions a pair of nipples 44, 46 are provided, each of which is adapted to seat within outlet passages in the gun body and each of which also includes a plurality of flexible plastic sealing ribs 48.

The gun body 12 includes the handle 14 just referred to and this part, in turn, includes a vertically extending slot 50 adapted to receive a center rib 52 forming part of the trigger safety 26 when the same is in a folded position The handle 14 also includes an opening 54 adapted for reception of the pivot pin 56 which is preferably integrally formed on the trigger safety rib 52. The slot 50 also provides a convenient receptacle for one leg 58 of a trigger return spring generally designated 60 and shown to be of the "clothespin" or hairpin type, operating in response to torsional forces generated in its center coil 59.

The upper portion of the gun body 12 includes as a major element, a component passage and product flow control valve housing 16 having the component referred to in detail elsewhere herein, and also shown to include spool receiving means in the form of circular sidewalls 61 defining a cylindrical bore 62 extending transversely to the principal axis of the housing 16. The control housing 16 is also shown to accommodate identical or similar, precisely formed product flow control jets 64, 66 each of which preferably contains a alignment rib 68, 70 and which is secured axially in place by an associated jet lock means in the form of a screw-type compression fitting 72, 74.

Surmounting the housing 16 is a combination nozzle latch and ejector element receiver generally designated 76 and shown to include generally parallel or slightly tapering spaced apart side walls 78, 80, designed to snugly engage the ejector when in the locking position, each of which includes an identical small opening 82 for receiving the pivot ears 84 forming a part of the nozzle latching and ejector element 22. This unit 22 in turn is shown to comprise a rocker-style lever assembly having a finger tab 86 lying to one side of the pivot ears 84 and generally horizontally and vertically extending legs 88, 90, lying on the opposite side of the pivot point 84. The end portion of the latching leg 88 terminates in a claw 92, while the front face 94 of the ejector leg 90 acts to engage the rear face of the nozzle, described in greater detail herein. The latch and ejector receiver 76 has its sidewalk 78, 80 spaced closely enough apart such that these walls snugly engage the legs 88, 90 of the latching and ejector element 22, preventing it from moving freely and helping return the nozzle 20 in place.

The nozzle receiver assembly 18 is disposed at the forward end of the housing 16 and includes a radially inwardly facing cylindrical nozzle guide surface 95 terminating at its inner end in a front wall portion 96 which reference will be made elsewhere. Alignment slots 98, 100, 102, are provided in the nozzle guide surface 95.

The other major element shown in FIG. 2 includes the flow control valve spool generally designated 104, and shown to include identical outboard ears 106, 108, each of which may be drilled holes as shown at 107, 109 to receive self-tapping threaded fasteners 111, 113. The spool 104 is subdivided into a pair of valve elements 110, 112 each including its own component flow passage 114, 116; these passages are disposed parallel to each other.

A seal in the form of identical O-rings 118, preferably made from a "viton" fluoroelastomer, are disposed in grooves of a conventional type, and extend circumferentially about the spool 104 to subdivide it into the elements 110, 112 just described. The spool is actuated by rotation which is brought about by arcuate movement of the trigger assembly 24. The trigger 24 includes the hand piece 120, which is bifurcated so as to provide, at its upper end, leg portions 122, 124, each of which is slotted at 126, 128 so as to receive the spool ears 106, 108. The ears are then held in position by the fasteners 111,113.

Consequently, the trigger assembly 24 depends from the spool 104 and pivots about its center line axis.

Referring now to FIG. 3, the assembled gun 10 is shown in an off position of use with the trigger forward and the valve 104 in a closed position. The gun body 12 is shown to be assembled with one of the fittings 31 on the end of the hose 28 being shown in place within a larger smooth counterbore 130 in the housing 16. The fastener 35 (FIG. 1) removably holds the fitting 31 in place in the counterbore 130. The fitting 31 includes an annular O-ring 132 in a groove 134 to facilitate sealing of the fitting 31 at the hose end within the large smooth counterbore 130 in fluid-tight relation. (FIG. 5).

As shown, the jet lock 74, which is in the form of compression screw, includes a hexagonal or other contoured inner diameter 75 suitable for reception of a locking wrench is secured in a smaller threaded counterbore 77 in the housing 16. The counterbore threads may be formed merely by forcibly inserting the lock 74 in the counterline, covering the plastic to cold flow. Thereafter, additional locking force can be generated simply by twisting the lock 74. A forward edge portion 79 of the lock 74 engages an outer end portion 67 of the jet 64, holding it snuggly in place in the housing 16. The interior opening or orifice 65 in the jet may be sized as indicated to achieve the desired flow characteristics; the orifices 65 themselves may differ from each other in inside diameter if the stoichiometry of the final product indicates that the components should be provided in different ratios by volume.

As shown in FIG. 3, the spool 104 is positioned in such a way that fluids may not flow therethrough when the trigger is in its inactive position. The center spool component flow passage 114 is out of registry with either of the adjacent passages, and is blocked against both forward and reverse product flow by engagement with portions of the inwardly directed cylindrical bore surface off the orifice-seat assembly 61 defining the spool-means receiving opening 62. The housing 16 also includes a very short, reduced diameter product outlet passage 115 tapered adjacent its opening so as to communicate with an enlarged diameter nipple port engaging surface 117 (FIG. 5), which surface 117 lies closely adjacent the spool passage 114.

The combination of the various bores, counterbores, and passages, including those receiving the hoses 28, 30, and their end fittings 31, 33, the jet locks 72, 74 and the jets themselves 64, 66 combine to comprise a pair of inlet passages, while the surfaces 115, 117 define a product outlet passage (only one shown in detail), flow through which is controlled by the movement of the spool 104. Thus, an important feature of the invention is that the housing 16 contains coaxially aligned pairs of passages and a flow control valve for each passage.

FIG. 4 shows the elements referred to in connection with a description of FIG. 3 in the same relation, except that the hand piece portion 120 of the trigger 24 has been pulled to a fully opened position, (the safety 26 having been moved to a retracted position) which fully compresses the spring 60. Fluid is thus free to flow through the passages formed as described above. FIG. 4 shows that the claw portion 92 on the nozzle latch and nozzle ejector element 22 engages the latch-engaging surface 38 of the nozzle 20. The rear end face 131 of the nozzle 20 is seated on or adjacent the front wall 96 of the nozzle receiver assembly 18, while the front face 94 of the ejector leg 90 engages the nozzle end wall 131 in the area between the nozzle inlets or nipples 44, 46.

FIG. 5 shows a fragmentary portion of one leg 122 of the trigger 24 in an intermediate position with the spool 104 positioned such that one of its passages 114 is partly in registry with the jet opening or orifice 65, but also partially blocked by a portion of the orifice-seat assembly 64. This position permits controlled volumetric flow or metering of the reactive components so that proper component ratio can be assured even at low or intermediate flow rates.

The ability to change both the rate of discharge and the relative ratio of component by volume in the mix can be achieved by adjustments to the jet orifices and the spool passages. The orifices may be changed in diameter and shape. As the orifices are uncovered by the spool passages, flow first begins and then may be regulated. Changing the cross section shapes of these passages can be achieved by mixture control as required by the stoichiometry of the mixture.

Prior art guns having ball check and modified ball check valves were sometimes subject to condition of erratic flow when less than fully opened. The construction of the present invention is an improvement over the prior art in this important respect.

Another important aspect of this design with reference to prior art is the effective shutoff of the spool passageway (FIGS. 3–5) at both ends of the passageway. This prevents contamination from reaching the passageway via a rearward flow from the nozzle, or from the atmosphere Rearward flow of mixed product occurs if the operator actuates the gun with a blocked nozzle. This causes reacting and expanding material to be trapped in the back of the nozzle and to expand rearward. The present design effectively blocks off the spool passageway from being fouled by such possible operation misuse and protects the isocyanate from exposure to either air or reactants.

FIG. 6 shows the nozzle 20 being ejected, or ready for reloading, as the case may be. In this case, the front face 95 of the vertically extending ejector leg 90 is shown forward of the plane of the front wall 96 of the nozzle receiver 18. Pivoting of the latch 22 about the ears 84 provides both an ejection lever action and a unlocking or unlatching action. The rocking movement permits a cooperative action between the receiver assembly 18 and the nozzle 20 insofar as fully seating the nozzle biases the latch toward a position with its claw 92 engaging the nozzle 20, while actuating the finger tab 86 both releases the latch and ejects the nozzle. As pointed out above, the snug fit of the ejector assembly into the ejector receiving groove of the body assures a locking of the latch over the nozzle until it is released by the leverage on the ejector assembly.

In its preferred form, the entire gun just described may be made from plastic materials, with the exception of the spool, the fasteners, the jet locks the trigger spring 60, and the hose end fittings. A major advantage of the invention is that there is complete coaxial alignment of the passages within the nozzle nipples, the component outlet passages, the spool passages and the product inlet passages. This greatly simplifies manufacturing and servicing of the gun.

The arrangement of the jets is such that they may be individually removed and replaced; the orifice or passage in the jet through which the resin component of the foam passes may be sized or shaped differently from the jet orifice through which the isocyanate or other component flows, and either or both orifices may be shaped differently than round in cross-section if desired. The jet locks are preferably metal, and are desirably made as socket head set screws with suitable center passages formed therein.

Each jet preferably includes a rib for alignment so that its curved front face will remain in snug alignment and contact with the curved spool surface which it engages in use The hose fittings preferably include the O-ring and groove shown to provide a fluid tight seal and easy removability; other arrangements may be used if desired.

The nozzle itself may be of a type known to those skilled in the art, including the kind shown in U.S. patent application Ser. No. 626,332, filed June 29, 1984, now U.S. Pat. No. 4,603,813, or of the type shown and described in U.S. Pat. No. 3,784,110 ('110). These nozzles include a mixing chamber and a series of baffles or the like to permit good mixing prior to discharge.

The spool may be manufactured in an automatic screw machine or the like, being a cylindrical spool with end ears, transverse fluid passages and circumferential O-ring grooves. It is located in a position of registry by the yoke type trigger, which also prevents spool end play by having its inner surfaces lying closely adjacent the outer surface of the housing 16.

In use, the remote ends of the hoses are hooked to supply tanks in a known manner. Then, it is merely necessary to insert a nozzle assembly in the gun. When the nozzle is fully seated, it is held in place by engagement with the latch. Thereupon, merely actuating the trigger performs the steps necessary to discharge a foaming plastic product through the nozzle outlet. The components are kept separate from each other during flow and mix only within the nozzle. If work is to be discontinued for a time sufficient for the foaming products to react and "set up" in the chamber, the nozzle may be removed and replaced and the process begun again. The gun may be used with a number of nozzles for several applications or shifts. The gun is sufficiently economical that it may be thrown away after the contents of the tanks are emptied; however, the gun may be easily cleaned and rebuilt, if desired, at low cost without the use of skilled labor.

In use, the gun provides the advantages of simplicity, low cost of manufacture, ease of serviceability, and excellent control over the rate of product discharge. Consequently, its quality control potential approaches or exceeds that of considerably more expensive guns.

It will thus be seen that the present invention provides a new and improved low cost mixing and dispensing gun, having a number of advantages and characteristics, including those herein pointed out and others which are inherent in the invention.

I claim:

1. A gun assembly for directing at least two individual streams of separate reactive liquid components toward an associated mixing and dispensing nozzle assembly, said components being adapted, upon reaction with each other, to produce a thermosetting resinous material, said gun assembly comprising, in combination, a gun body including means therein defining plural spaced apart liquid inlet passages, and plural, spaced apart liquid outlet passages positioned to receive liquid from said liquid inlet passages, said body also having a cylindrical sidewall defining a spool-receiving bore extending transversely of the axes of said inlet and outlet passages, means including an end wall and sidewalls formed in said body for defining an opening in said gun body for receiving a nozzle assembly in fluid-tight relation to said gun body interior, a gun handle extending downwardly from said gun body in position of use, a flow control valve spool rotatably received within said spool-receiving bore in fluid tight relation, passages extending through said valve spool transversely of the rotational axis thereof, said passages being spaced from each other and constructed and arranged so that, upon valve spool rotation, said passages become, respectively, fully registered, partially registered, and finally completely out of registry with said inlet and outlet passages in said housing, said valve spool further including trigger mounting means on each end thereof, each of said outlet passages terminating at said end wall of said nozzle-receiving opening, whereby said components may be mixed within the end of a nozzle positioned within said nozzle-receiving opening in said gun body, a trigger unit having one end portion thereof actuable by the fingers of a user and having its other end bifurcated so as to form a yoke- having opposed, spaced apart end portions, each of said yoke end portions being affixed to one of said trigger mounting means on said valve spool ends, said yoke end portions also lying closely adjacent said gun body and being spaced apart therefrom only by a working clearance so as to prevent transverse movement of said valve spool within said gun body, and means normally biasing said trigger to a position wherein said valve spool passages are out of registry with said liquid inlet and outlet passages.

2. A gun assembly as defined in claim 1 wherein said plural passages comprise two passages.

3. A gun assembly as defined in claim 1 wherein said spool includes seal means adapted to provide fluid tight mutual engagement of said cylindrical bore and said spool, said seal means limiting product flow axially of said cylindrical spool.

4. A gun assembly as defined in claim 1 wherein said gun body further includes means for securing component supply hose fittings within a portion of said inlet passages.

5. A gun assembly as defined in claim 1 which further includes component carrying hoses having end portions received in said inlet passages, said hoses including fittings on the end portions thereof, said fittings each including a seal ring groove and an elastomeric seal disposed within said groove.

6. A gun assembly as defined in claim 1 wherein said handle further includes a trigger safety having a portion thereof pivotally mounted on said handle and another portion adapted to engage a portion of said trigger in the operative position of use of said trigger safety, to prevent trigger movement.

7. In combination, a gun assembly and a mixing and dispensing nozzle, said gun assembly being adapted to direct at least two individual streams of separate reactive liquid components into the interior of said mixing and dispensing nozzle assembly, said components being adapted, upon reaction with each other, to produce a thermosetting resinous material, said nozzle including at least one inlet passage, a mixing chamber in communication with said at least one liquid inlet passage, and a nozzle outlet passage, and said gun assembly comprising, in combination, a gun body including means therein defining plural spaced apart liquid inlet passages, plural, spaced apart liquid outlet passages positioned to receive liquid from said inlet passages, a cylindrical sidewall defining a spool-receiving bore extending transversely of the axes of said inlet and outlet passages, means including an end wall and sidewalls defining an opening in said gun body for removably receiving said nozzle in fluid-tight relation to said gun body, a gun handle extending downwardly from said gun body in position of use, a flow control valve spool rotatable received within said spool-receiving bore in fluid tight relation, liquid passages extending through said valve spool transversely of the rotational axis thereof, said passages being spaced from each other and constructed and arranged so then, upon valve spool rotation, said passages become, respectively, fully registered, partially registered, and completely out of registry with said inlet and outlet passages in said housing, said valve spool further including trigger mounting means on each end thereof, said outlet passages terminating at said end wall of said nozzle-receiving opening, whereby said components may be mixed within said nozzle interior a trigger unit having one end portion actuable by the fingers of a user and having its other end bifurcated so as to form a yoke having opposed, spaced apart end portion, each of said yoke end portions being affixed to one of said trigger mounting means on said valve spool ends, said yoke end portions also lying closely adjacent said gun body and being spaced apart therefrom only by a working clearance so as to prevent transverse movement of said valve spool within said gun body, and means normally biasing said trigger to a position wherein said valve spool passages are out of registry with said liquid inlet and outlet passages.

* * * * *